United States Patent [19]

Ruben

[11] Patent Number: 5,130,845
[45] Date of Patent: Jul. 14, 1992

[54] REAL IMAGE VIEWFINDER

[75] Inventor: Paul L. Ruben, Penfield, N.Y.

[73] Assignee: Eastman Kodak Company, Rochester, N.Y.

[21] Appl. No.: 628,967

[22] Filed: Dec. 17, 1990

[51] Int. Cl.$^5$ .................. G02B 23/14; G02B 5/04; G03B 13/02

[52] U.S. Cl. .................. 359/428; 354/219; 359/656; 359/835

[58] Field of Search .......... 350/562, 566, 565; 359/424, 427, 428, 835, 656; 354/219

[56] References Cited

U.S. PATENT DOCUMENTS 4,318,584  3/1982  Ando et al. .................. 350/562

FOREIGN PATENT DOCUMENTS 183430  7/1988  Japan .
226616  9/1988  Japan .
226517 10/1989  Japan .

Primary Examiner—Scott J. Sugarman
Attorney, Agent, or Firm—M. Lukacher; S. Short

[57] ABSTRACT

A real image viewfinder with an objective having movable focusing lens(es) and a field lens at the end thereof furtherest from the field of view, an eyepiece lens and image inverting optics, preferably in the form of a Type II Porro prism wherein the real image is focused to fall on a surface of the field lens, which is desirably a plano surface facing the inverting optics. This field lens surface is also at the focus of the eye piece lens. A pattern (a reticle) is located on the field lens surface. Since the objective forms a focus at the location of the reticle, observation of the reticle indicates when the objective is focused. A camera picture taking lens may be coupled to a movable lens in the objective for focusing the taking lens.

6 Claims, 1 Drawing Sheet

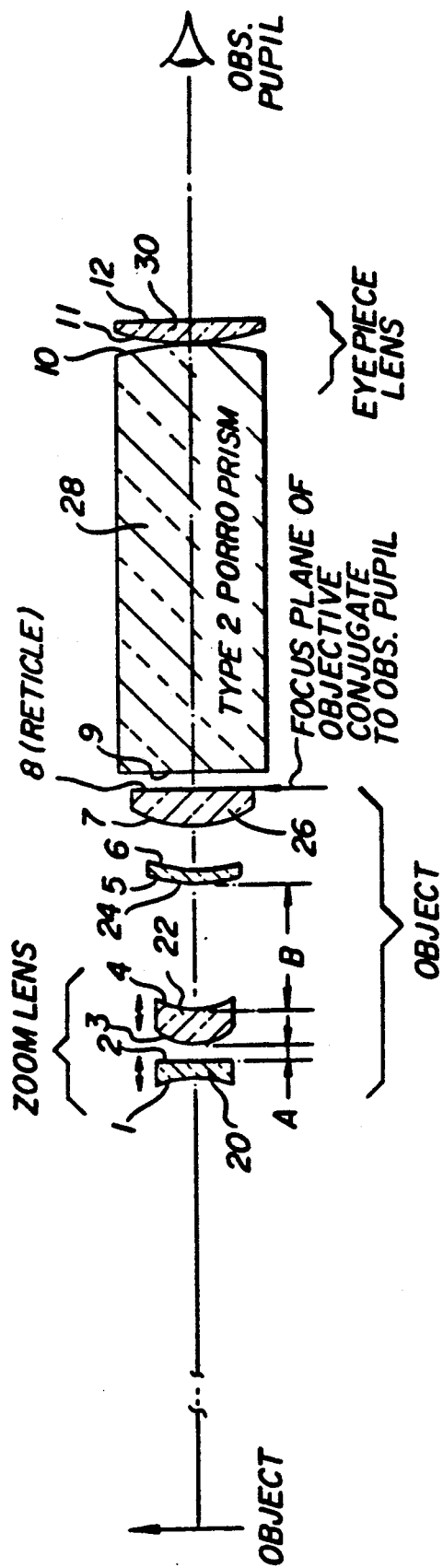

REAL IMAGE VIEWFINDER

BACKGROUND OF THE INVENTION

The present invention relates to a real image viewfinder which enables observation of an image formed by an objective lens as the objective lens brings the object into focus and indicates that the object is in focus, and particularly to a real image viewfinder which forms an erect image of the object in a field of view through an observation pupil.

The invention is especially suitable for use in a camera for viewfinding purposes. The invention may also be used in optical sighting devices for other purposes.

Viewfinders which have been proposed utilize a Type II Porro prism having a pattern or reticle, sometimes called a field frame, which is etched on a surface of the prism. A Porro prism is a well known optical device having totally reflecting right angle prisms which inverts and reverts the image and increases the optical path without increasing the length of the viewfinder. It is sometimes desirable to avoid using a Porro prism, especially where it is desired to reduce the costs of the viewfinder. Etching the finder pattern (reticle) on the prism surface also increases the cost of making the viewfinder.

SUMMARY OF THE INVENTION

Accordingly, it is the principal object of the present invention to provide an improved real image viewfinder wherein a frame pattern or reticle is not located on a surface of the inverting optics of the viewfinder, such as a Type II Porro reflector, such as a Porro prism.

It is another object of the present invention to provide a real image viewfinder which can be constructed, without a prism or other optics in which reflection occurs, and with an optical element on which a field frame or pattern (a reticle) may be located.

The conventional design philosophy of viewfinders, for example as represented in the following Japanese patent applications (183,430 published Jul. 28, 1988; 266,517 published Oct. 24, 1989 and 226,616 published Sept. 21, 1988) to locate the field pattern or reticle on which the image of the object in the field of view is formed on a reflecting surface of the inverting optics (usually a Type II Porro prism). Contrary to this design philosophy and in accordance with the invention, it has been discovered that the field pattern may be formed on a surface of the field lens of the objective of the viewfinder thereby simplifying the construction of the viewfinder and enabling viewfinders to be provided without a prism and still have a position in the viewfinder on an element of the optics for the reticle to be located.

Briefly described, a real image viewfinder in accordance with the invention has an objective, inverting optics and an eyepiece. The objective includes a field lens having surfaces, one facing the object and the other facing the eyepiece. A pattern (a reticle) for finding an object in the field of view is located on one of the surfaces of the field lens at which the objective forms the real image of an object being focused by the objective in the field of view. The real image is relayed to an observation pupil, as by inverting optics, between the eye piece and the field lens.

BRIEF DESCRIPTION OF THE INVENTION

The foregoing and other objects, features and advantages of the invention will become more apparent from a reading of the following description in connection with the accompanying drawing which is a sole figure schematically showing a real image viewfinder embodying the invention.

DESCRIPTION OF THE PREFERRED EMBODIMENT

Referring to the figure, the optical axis of the viewfinder optics is indicated as extending between and object in the field of view and an observation pupil. The optical axis shown as a line consisting of long and short dashes. Along this optical axis is an objective, inverting optics and an eyepiece lens. In the presently preferred embodiment of the invention shown in the drawing, the objective is made up of a zoom lens having two elements 20 and 22 both of which are indicated as being moveable and are separated by an air gap. The gap is variable and is of length "A" along the optical axis. A correcting lens 24 is spaced from the second element 22 of the zoom lens by a distance "B" also measured along the optical axis. The center of curvature of all of the lenses is on the optical axis.

The last lens 26, with respect to the field of view, in the objective is a field lens. This lens 26 has a curved surface, which is preferably aspherical and a plano surface. The reticle may be a pattern having an outside rectangular frame made up of closely spaced lines etched into the plano surface, a parallax indicating horizontal line and cusps at the center thereof indicating the center of focus. This reticle is preferably provided on the plano surface (surface 8 which is marked with the word reticle in the drawing). It may be on the other (non-plano) surface of the lens, if the object focus is thereat, and if the other surface is nearly plane.

The objective forms an image on the plano surface where the reticle is located. This plano surface is also at the focus of the eyepiece lens consisting of the curved surface 11 at the rear (observation end) of the inverting optics 28 and a plano convex lens 30. In other words, the distance to the object in the far field and to the observation pupil are conjugate distances. The inverting optics is preferably a Type II Porro prism. It may be a Type II reflector having reflecting surfaces similarly disposed to the reflecting surfaces of a Type II Porro prism. Two of the surfaces act as deviators while the other surfaces invert and revert the image so that an erect, real image of the object appears at the observation pupil. The eyepiece lens and inverting optics relay the image of the reticle to the observation pupil.

The following table is an example of the design of the lenses in terms of the curvature of their surfaces, which are marked 1 through 12 in the drawing. It will be notes that the optical system has an approximate half field of view of 10.5° in this exemplary design. The zoom lens and the other optics provides a variable magnification range of from 0.4 to 0.71 times. The elements 20 and 24 are preferably made of styrene plastic. The other elements are preferably made of acrylic plastic.

| SURFACE | CLEAR APERT | RADIUS OF CURVATURE | THICKNESS |
| --- | --- | --- | --- |
| 1 | 5.60 | −10.362 | 0.950 |
| 2 | 5.47 | 38.4175 | A |
| 3 | 5.40 | 3.545 | 3.676 |
| 4 | 4.08 | aspherical | B |
| 5 | 6.24 | aspherical | 1.1 |
| 6 | 6.39 | 16.6101 | 3.363 |
| 7 | 8.42 | aspherical | 2.426 |

-continued

| SURFACE | CLEAR APERT | RADIUS OF CURVATURE | THICKNESS |
|---|---|---|---|
| 8 | 8.28 | Plano | 1.215 |
| 9 | 8.38 | Plano | 31.62 |
| 10 | 10.66 | −27.8089 | Air Space 0.05 |
| 11 | 10.55 | 18.1807 | 1.500 |
| 12 | 10.36 | 418.453 | 20.00** |

**Distance to Observation Pupil From Surface 12

All dimensions are in millimeters. The aspherical surfaces are designed for aberration correction in accordance with conventional aspheric lens design techniques. The nominal radius of surface 4 is 25.78 mm, of surface 5 is 13.79 mm and of surface 7 is 18.45 mm. These surfaces differ from spherical (are aspherical) in directions perpendicular to the optical axis in order to provide aberration correction. The thereto define the aspherical surface and are obtained using an aspheric equation.

ASPHERIC EQUATION:

$$X = \frac{CY^2}{1\sqrt{1-(K+1)C^2Y^2}} + DY^4 + EY^6 + FY^8 + GY^{10}$$

SURF. 4  $C = 0.03878976$   $D = 0.7861E\text{-}02$   $F = 0.9259E\text{-}03$
         $K = 33.67$        $E = -0.1897E\text{-}02$  $G = -0.1054E\text{-}03$
         VERTEX RADIUS = 25.78

SURF. 5  $C = 0.07251632$   $D = -0.2855E\text{-}03$  $F = -0.1431E\text{-}04$
         $K = -100.13$      $E = 0.2131E\text{-}03$   $G = 0.3744E\text{-}06$
         VERTEX RADIUS = 13.79

SURF. 7  $C = 0.05420054$   $D = 0.2253E\text{-}02$   $F = -0.1705E\text{-}05$
         $K = 11.86$        $E = -0.2424E\text{-}04$  $G = 0.1250E\text{-}07$
         VERTEX RADIUS = 18.45

From the foregoing description it will be apparent that there has been provided an improved real image viewfinder which can be made compact and which does not rely upon the surfaces of the inverting optics (the Type II Porro prism) as locations for the reticle thereof. Variations and modifications in the herein described viewfinder, within the scope of the invention, will undoubtedly suggest themselves to those skilled in the art. Accordingly the foregoing description should be taken as illustrative and not in a limiting sense.

I claim:

1. In a real image viewfinder which forms an image of a field of view and having an objective, inverting optics and an eyepiece, the improvement comprising a field lens in the objective having surfaces respectively facing the field of view and the eyepiece, a pattern for defining the field of view located on one of said surfaces of said field lens at which said objective forms said real image, and said real image being relayed to an observation pupil by said inverting optics and said eyepiece.

2. The improvement according to claim 1 wherein said one surface of said field lens is plano.

3. The improvement according to claim 2 wherein said one surface faces said eyepiece.

4. The improvement according to claim 3 wherein said inverting optics is Type II Porro reflecting optics with all of its faces clear.

5. The system according to claim 4 wherein said pattern defines a reticle.

6. The system according to claim 4 wherein said Porro reflecting optics is a prism.

* * * * *

UNITED STATES PATENT AND TRADEMARK OFFICE
CERTIFICATE OF CORRECTION

PATENT NO. : 5,130,845
DATED      : Jul. 14, 1992
INVENTOR(S): Paul L. Ruben

It is certified that error appears in the above-indentified patent and that said Letters Patent is hereby corrected as shown below:

Col. 3, line 19      After "The" insert --distances to the sagital plane and along perpendiculars--.

Col. 3, Aspheric Equation      Delete the existing equation and replace it with the following correct equation:

$$X = \frac{CY^2}{1+\sqrt{1-(K+1)C^2Y^2}} + DY^4 + EY^6 + FY^8 + GY^{10}$$

Signed and Sealed this

Twelfth Day of April, 1994

Attest:

BRUCE LEHMAN

*Attesting Officer*      *Commissioner of Patents and Trademarks*